(12) United States Patent
Jiang et al.

(10) Patent No.: US 6,665,498 B1
(45) Date of Patent: Dec. 16, 2003

(54) HIGH-SPEED OPTICAL DATA LINKS

(76) Inventors: Wenbin Jiang, 2860 Blazing Star Dr., Thousand Oaks, CA (US) 91362; Hsing-Chung Lee, 23246 Park Ensenada, Calabasas, CA (US) 91302; Michael J. Hartmann, 3 Cohee Cir., Wilmington, DE (US) 19803-1114

( * ) Notice: Subject to any disclaimer, the term of this patent is extended or adjusted under 35 U.S.C. 154(b) by 0 days.

(21) Appl. No.: 10/185,091

(22) Filed: Jun. 28, 2002

Related U.S. Application Data

(60) Provisional application No. 60/306,697, filed on Jul. 20, 2001.

(51) Int. Cl.[7] ............................................. H04B 10/00
(52) U.S. Cl. ........................ 398/135; 398/136; 398/154; 398/164
(58) Field of Search ................... 359/152, 153, 359/163, 158, 154; 375/220; 340/855.4, 855.5; 398/135, 136, 140, 154, 164

(56) References Cited

U.S. PATENT DOCUMENTS

| | | | |
|---|---|---|---|
| 4,703,471 A | * 10/1987 | Fitelson et al. | ............. 359/115 |
| 4,953,930 A | * 9/1990 | Ramsey et al. | ............. 359/118 |
| 5,455,703 A | * 10/1995 | Duncan et al. | ............. 359/152 |
| 5,479,288 A | * 12/1995 | Ishizuka et al. | ............. 359/163 |
| 5,537,093 A | * 7/1996 | Aunon et al. | ................ 340/531 |
| 5,594,576 A | * 1/1997 | Sutherland et al. | ......... 359/118 |
| 5,926,303 A | * 7/1999 | Giebel et al. | ................ 359/163 |
| 6,075,634 A | * 6/2000 | Casper et al. | ................ 359/152 |

* cited by examiner

Primary Examiner—Leslie Pascal
Assistant Examiner—Dalzid Singh
(74) Attorney, Agent, or Firm—Robert A Parsons; Michael W Goltry; Parsons & Goltry

(57) ABSTRACT

A high-speed optical data link includes a system circuit board, a first ASIC coupled to convey electrical information to and from up level data management circuits, and a second ASIC electrically coupled to the first ASIC. A fiber optic module mounted on the system circuit board including a receiver, a transmitter and the second ASIC. The receiver includes a photo-diode positioned to receive optical signals, a trans-impedance amplifier electrically coupled to the photo diode, and a post-amplifier electrically coupled to the trans-impedance amplifier and to the second ASIC. The transmitter includes a laser positioned to convey optical signals to a remote optical receiver and a laser driver electrically coupled to the laser and to the second ASIC. Both the first and the second ASICs include clocking and equalization/retiming functions for recovering distorted data transmitted therebetween through electrical traces on the system circuit board so as to send electrical data at rates equal to or higher than 10-Gbps.

10 Claims, 2 Drawing Sheets

HIGH-SPEED OPTICAL DATA LINKS

CROSS-REFERENCE TO RELATED APPLICATION

This application claims the benefit of U.S. Provisional Application Serial No. 60/306,697, filed Jul. 20, 2001.

FIELD OF THE INVENTION

This invention relates to optical transmitters, receivers, and transceivers.

More specifically, this invention relates to data links in optical transmitters, receivers, and transceivers.

BACKGROUND OF THE INVENTION

Optical transmitters, receivers and transceivers are used for converting electrical data into optical data for transmission on optical fibers and for converting optical data back into electrical data for processing by network equipment. Normally, an optical transmitter includes a light source, such as a laser driver and a laser diode, and an optical receiver includes a light conversion device, such as a post amplifier, a trans-impedance amplifier and a PIN photodiode or an APD. The transmitter or receiver is generally mounted on a network circuit board to interface with other data processing IC chips, such as a serializer or de-serializer, a data framer for coding, such as 8B/10B coding, and a higher level data control IC. This type of structure, however, fails to, perform when the data transport rate reaches around 10 Gbps or beyond, as the electric traces on the printed circuit board introduce noises and jitters and distort the signal integrity at such a high frequency.

Current technology requires that a serializer and de-serializer be integrated into the transmitter and receiver module or modules to allow electrical interfaces to operate at lower frequency. As an example, for an OC192 data rate, the electrical interfaces for the data link module will require 16 channels of 622 Mbps. The module, which is called a fiber optical transponder, can then be mounted onto the board to interface with other IC chips to fulfill the network management function. Consequently, the module requires many electrical interfaces, typically with more than 50 pins. The large number of pins and the extra internal circuitry dictates that the module size is large. The power consumption is also a serious issue.

It would be highly advantageous, therefore, to remedy the foregoing and other deficiencies inherent in the prior art.

Accordingly, it is an object the present invention to provide a new and improved high-speed optical data link.

Another object of the present invention is to provide a new and improved high-speed optical data link capable of conveying data at around 10 Gbps rates or beyond.

And another object of the present invention is to provide a new and improved high-speed optical data link that is simple and relatively inexpensive to manufacture.

Still another object of the present invention is to provide a new and improved high-speed optical data link that is smaller than prior art devices and less electrical pin counts capable of conveying information at similar rates.

SUMMARY OF THE INVENTION

Briefly, to achieve the desired objects of the present invention in accordance with a preferred embodiment thereof, provided is a high-speed optical data link including a system board with first and second ASICs mounted thereon. The first ASIC includes a clocking and an equalization function for recovering distorted data. The second ASIC is electrically coupled to the first ASIC for conveying electrical signals therebetween and the second ASIC includes one of a clocking and an equalization function for recovering distorted data.

In a more specific embodiment, a high-speed optical data link includes a first ASIC coupled to convey electrical information to a remote circuit and a second ASIC electrically coupled to the first ASIC for conveying electrical signals therebetween. A fiber optic receiver module is mounted on the system circuit board and includes a photo diode positioned to receive optical signals from a remote source, a trans-impedance amplifier electrically coupled to the photo diode, and a post-amplifier, such as a limiting amplifier or an auto-gain control circuitry, electrically coupled to the trans-impedance amplifier and to the second ASIC. The second ASIC includes a clocking and an equalization function for data integrity and the first ASIC includes a function for recovering distorted data through the same clocking and an equalization scheme as provided by the second ASIC.

In another more specific embodiment a high-speed optical data link also includes a first ASIC coupled to receive electrical information form a remote circuit and a second ASIC electrically coupled to the first ASIC for conveying electrical signals therebetween. A fiber optic transmitter module mounted on the system circuit board includes a laser positioned to convey optical signals to a remote source and a laser driver electrically coupled to the laser and to the second ASIC. The first ASIC includes a clocking and may include an equalization function for data transmission and the second ASIC includes an equalization function for recovering distorted data through the same clocking. It should be noted that both of the last two embodiments described can, optionally, be packaged and included on a common board with the first and second ASICs being common.

The embodiments described above include a novel method of electrically communicating information at 10-gigabits per second or beyond on a circuit board. The method includes the steps of providing a system circuit board including a first position and a second position, receiving electrical signals from an external source at the first position on the system circuit board, clocking and equalizing the electrical signals on the system circuit board for providing signals with integrity, conveying the equalized signals to the second position on the system circuit board, and receiving the equalized signals at the second position and recovering distorted signals using a de-clocking and re-timing step.

BRIEF DESCRIPTION OF THE DRAWINGS

The foregoing and further and more specific objects and advantages of the invention will become readily apparent to those skilled in the art from the following detailed description of a preferred embodiment thereof, taken in conjunction with the drawings in which.

DETAILED DESCRIPTION OF THE DRAWINGS

Figure 1:
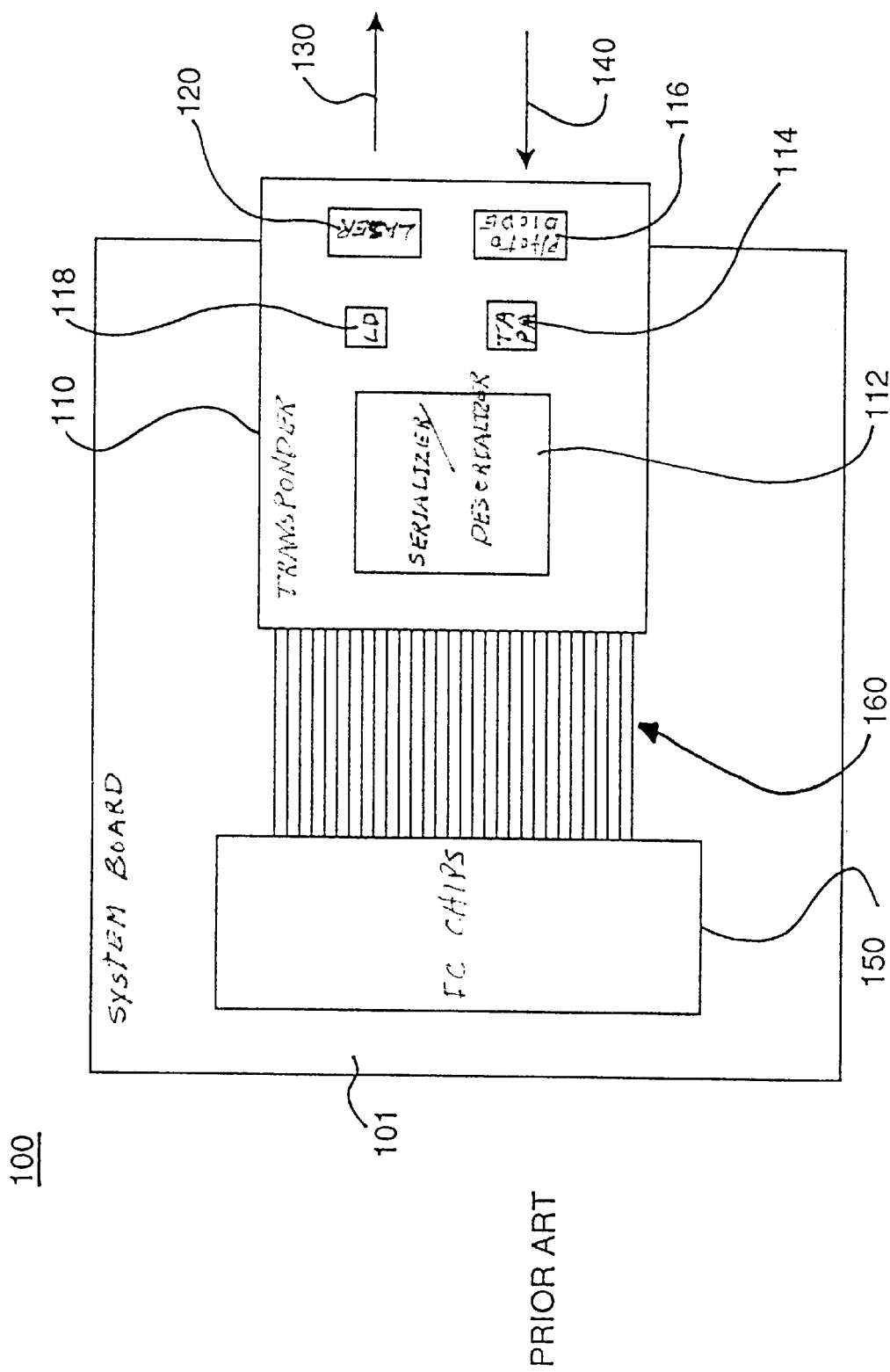
FIG. 1 is a simplified block diagram/top plan of a prior art optical data link.

Referring to FIG. 1, a simplified block diagram/top plan of a prior art optical data link 100 is illustrated. Data link 100 includes a system board 101 with a fiber optic transponder 110 mounted thereon. Electrical connections for the various components of transponder 110 are not illustrated since they are provided, in a well-known manner, through internal connections in the mounting structure. Transponder 110 includes a serializer/deserializer 112 electrically connected to a transimpedance amplifier and post-amplifier 114, which is in turn electrically connected to PIN photodiode 116. Photodiode 116 is positioned to receive modulated light signals from an optical fiber, represented by an arrow 140. Serializer/deserializer 112 is also electrically connected to a laser driver 118, which is in turn connected to drive a laser diode 120. Laser diode 120 is positioned to supply modulated output light to an optical fiber, represented by an arrow 130. Input and output electrical signals for transponder 110 are supplied by an electric interface, including connectors and printed circuit board copper traces designated 160, from board level IC chips, generally designated 150, The connectors and traces of electrical interface 160 on printed circuit board 101 introduce noises and jitters that distort the signal integrity, at high frequencies (e.g., in the 10-gigabits per second range or above), of signals communicated between transponder 110 and board level IC chips 150. Because of this distortion, electrical interface 160 must operate at lower frequencies, which requires a large number of channels. For example, a 10 Gbps signal is converted by serializer/deserializer 112 into 16 channels of differential signals 622 Mbps. However, the use of serializer/deserializer 112 in transponder 110 and the 16 channels, greatly increases the number of pins or connections in electrical interface 160. The 16 channels and associated connections greatly increases the size and power requirements of transponder 110.

Figure 2:
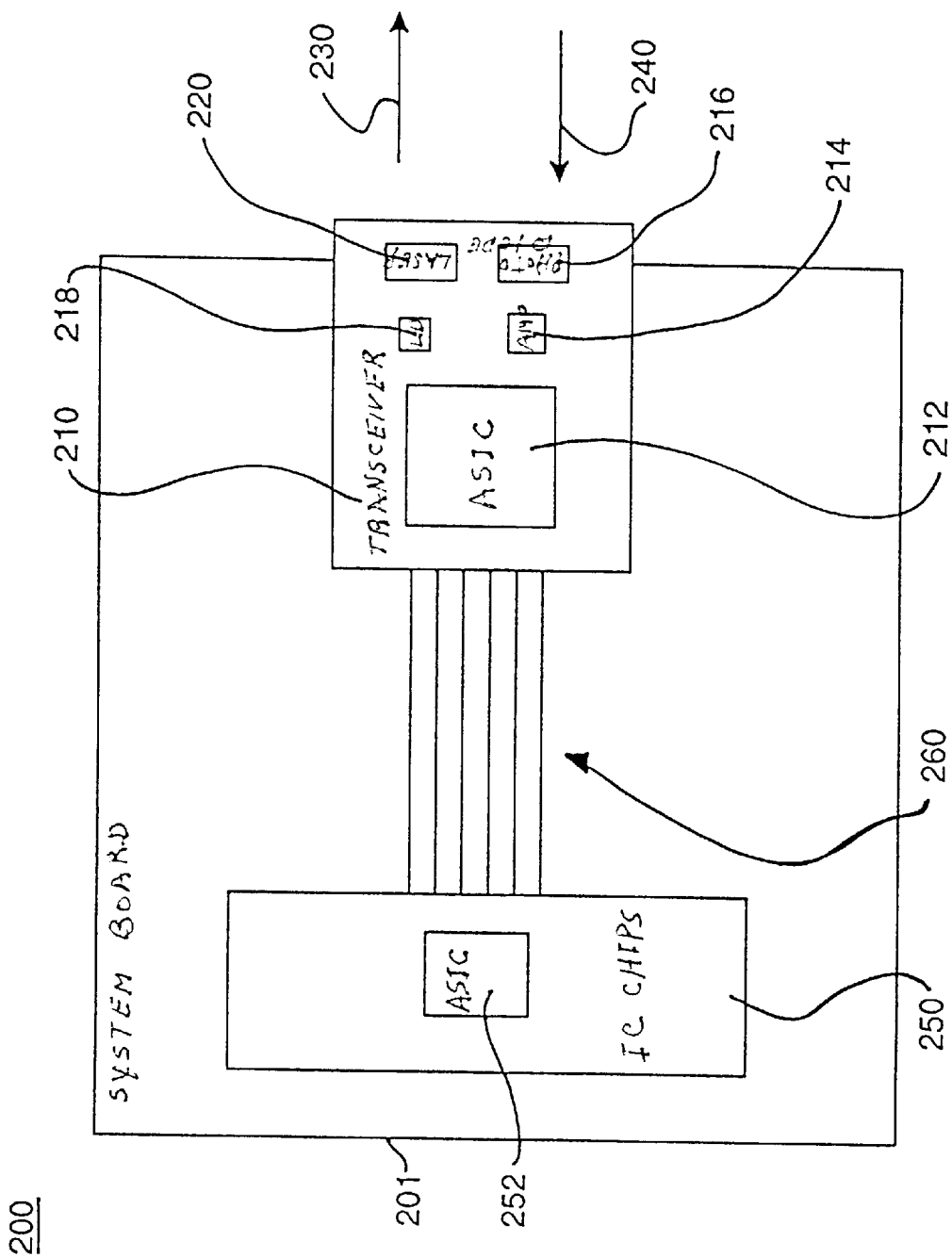
FIG. 2 is a simplified high speed optical data link in accordance with the present invention.

Turning now to FIG. 2, a simplified high-speed optical data link 200 in accordance with the present invention is illustrated. Data link 200 includes a system board 201 with a fiber optic transceiver 210 mounted thereon. Electrical connections for the various components of transceiver 210 are not illustrated since they are provided, in a well-known manner, through internal connections in the mounting structure. Transceiver 210 includes a first ASIC 212 electrically connected to a light converting device, illustrated herein for exemplary purposes as a transimpedance/post amplifier 214 electrically connected to a PIN photodiode 216. Photodiode 216 is positioned to receive modulated light signals from an optical fiber, represented by an arrow 240. ASIC 212 is also electrically connected to a light generating device, herein illustrated for exemplary purposes only as a laser driver 218 connected to drive a laser diode 220. Laser diode 220 is positioned to supply modulated output light to an optical fiber, represented by an arrow 230.

Input and output electrical signals for transceiver 210 are supplied by an electric interface, including connectors and printed circuit board copper traces and the like designated 260. Board level IC chips, generally designated 250, include a second ASIC 252, which is connected by electrical interface 260 to first ASIC 212 in transceiver 210. While a transceiver incorporating both an optical transmitter and an optical receiver is illustrated in this example for purposes of explanation, it will be understood that the pair of ASICs can be used with single optical transmitters, single optical receivers, optical transceivers, or any combination of these devices.

By incorporating the pair of ASICs in the optical transmitter, receiver, or transceiver, a 10 Gbps or higher serial electrical interface can be established directly between transceiver 210 and system board 250 through normal electrical interfaces 260, such as pin-grid-array, ball-grid-array, edge connectors, etc. A clock data recovery (CDR) is built into each of the ASICs 212 and 252. Also, each of the ASICs 212 and 252 operate to receive electrical signals from interface 260 and to transmit electrical signals through interface 260. Either ASIC 212 or ASIC 252 retimes and clocks the signal and provides driving power for the transmitting portion. For the receiving portion of ASICs 212 and 252, they both handle and recover the distorted data due to high frequency signal transmitting directly on the electric traces of the circuit board.

The clock and equalization/retiming can be performed using a variety of techniques, one of which is described in detail in a paper by Abhijit Phanse presented to the IEEE in New Orleans in September 2000, a copy of which is appended hereto and incorporated by reference.

Thus, each fiber optic data link includes a fiber optic transmitter module with a first ASIC to equalize/retime and recover electric data distorted by the electric traces on the system board and a second ASIC mounted in the system printed circuit board to clock and equalize the electric data and provide driving power for transmitting to the optical transmitter module through electric traces on the printed circuit board. The described fiber optic data link system operates at a data rate of more than 5 Gbps. In a preferred embodiment, the second ASIC on the system board includes a clocking and equalization function for data transmission over printed circuit traces and the first ASIC in the transmitter module includes a function for recovering the distorted data through the same coding and clocking scheme provided by the second ASIC. In another embodiment, the second ASIC on the system board includes a serializer for data serialization, a clocking, and an equalization function, and the driving power for data transmission over printed circuit traces, and the first ASIC in the transmitter module includes a function for recovering the distorted data through the same clocking scheme provided by the second ASIC.

As a typical example, the fiber optic data link includes a fiber optic receiver module mounted on a system printed circuit board. The fiber optic receiver module includes a photo diode, a trans-impedance amplifier, a post-amplifier, and a first ASIC to clock and equalize electric data and provide electric driving power for transmitting to the system printed circuit board through electrical traces on the printed circuit board. The system printed circuit board includes a second ASIC connected and designed to recover electric data distorted by the electric traces on the system printed circuit board. In this embodiment, the first ASIC on the receiver module includes a clocking and retiming function for data transmission and provides electric signal driving power, and the second ASIC on the system board includes a function for recovering the distorted data through the same clocking scheme provided by the first ASIC. Also in this example, the first ASIC on the receiver module includes a clocking and equalization function for data transmission, and the second ASIC on the system board includes a function for recovering the distorted data through the same clocking scheme provided by the said first ASIC and may further include a de-serializer for data de-serialization.

In yet another example, a fiber optic data link system includes a fiber optic transceiver module mounted on a system printed circuit board, the fiber optic transceiver module includes a transmitter, including a laser diode and a laser driver, a receiver and a first ASIC.

The receiver includes a photo diode, a trans-impedance amplifier and a post-amplifier. The first ASIC performs clocking and equalization/retiming functions to the data coming from the receiver and provides driving power for transmitting to the system board through electric traces on the printed circuit board. The first ASIC also performs the function of recovering distorted electric data coming from the system board through the electric traces on the printed circuit board for transmitting to the transmitter. The system printed circuit board includes a second ASIC for recovering electric data coming from the optical transceiver and distorted by the electric traces on the system printed circuit board and clocking and equalizing the electric data and providing driving power for transmission on the printed circuit board to the optical transceiver module.

The first ASIC on the transceiver module also includes a clocking and equalization/retiming function for data transmission on the receiver side, a function for recovering the distorted data through the same clocking scheme as provided by the second ASIC on the system board, and the second ASIC on the system board includes a function for recovering the distorted data through the same clocking scheme provided by the first ASIC and clocking functions for transmitting data to the transceiver through the electric traces on the circuit board. The first ASIC on the transceiver module also includes a clocking function and coding function for data equalization on the receiver side, a function for recovering the distorted data through the same coding scheme as provided by the second ASIC on the system board.

The second ASIC on the system board includes a function for recovering the distorted data through the same retiming and clocking scheme provided by the first ASIC, a clocking and equalization function for transmitting data to the transceiver through the electric traces on the circuit board, a serializer function for data serialization and de-serializer for data de-serialization.

Thus, a new and improved high speed optical data link is disclosed which includes a pair of ASICs that provide clocking and equalization functions for transmitting data through system boards at rates in the 10-Gbps range or above. By doing so, the fiber optic module, such as transmitter, receiver or transceiver, will have smaller size, lower power consumption, and less electrical pin counts. It is also easier to make the transceiver pluggable.

Various changes and modifications to the embodiments herein chosen for purposes of illustration will readily occur to those skilled in the art. To the extent that such modifications and variations do not depart from the spirit of the invention, they are intended to be included within the scope thereof, which is assessed only by a fair interpretation of the following claims.

Having fully described the invention in such clear and concise terms as to enable those skilled in the art to understand and practice the same, the invention claimed is:

1. A high-speed optical data link comprising:
   a system circuit board;
   a first ASIC coupled to convey electrical information to a remote circuit and a second ASIC electrically coupled together for conveying electrical signals therebetween through electrical traces on the system circuit board; and
   a fiber optic receiver module mounted on the system circuit board, the receiver module including a photo diode positioned to receive optical signals from a remote source, a trans-impedance amplifier electrically coupled to the photo diode, a post-amplifier electrically coupled to the trans-impedance amplifier, and the second ASIC coupled to the post-amplifier, the second ASIC including a clocking and equalization/retiming function for data transmission, the first ASIC on the system circuit board including a function for recovering distorted data through the same clocking function as provided by the second ASIC.

2. A high-speed optical data link as claimed in claim 1 wherein the remote circuit includes at least one board level IC chip electrically coupled to the first ASIC.

3. A high-speed optical data link as claimed in claim 1 wherein the remote source of the optical signals includes an optical fiber.

4. A high-speed optical data link comprising:
   a system circuit board;
   a first ASIC coupled to receive electrical information form a remote circuit and a second ASIC electrically coupled to the first ASIC for conveying electrical signals therebetween through electrical traces on the system circuit board; and
   a fiber optic transmitter module mounted on the system circuit board, the transmitter module including a laser positioned to convey optical signals to a remote optical receiver, a laser driver electrically coupled to the laser, and the second ASIC electrically coupled to the laser driver, the first ASIC on the system circuit board including a clocking and equalization/retiming function for data transmission, and the second ASIC including a function for recovering distorted data through the same clocking function as provided by the first ASIC.

5. A high-speed optical data link as claimed in claim 4 wherein the remote circuit includes at least one board level IC chip electrically coupled to the first ASIC.

6. A high-speed optical data link as claimed in claim 4 wherein the remote optical receiver to which the optical signals are conveyed includes an optical fiber.

7. A high-speed optical data link comprising:
   a system circuit board;
   a first ASIC mounted on the system circuit board and coupled to convey electrical information to a remote circuit and to receive electrical information from a remote circuit, and a second ASIC mounted in an optical module and electrically coupled to the first ASIC for conveying electrical signals therebetween through electrical traces on the system circuit board;
   a fiber optic receiver mounted in the optical module, the receiver including a photo diode positioned to receive optical signals from a remote source, a trans-impedance amplifier electrically coupled to the photo diode, and a post-amplifier electrically coupled to the trans-impedance amplifier and to the second ASIC, the second ASIC including a clocking function and equalization/retiming function for data transmission, the first ASIC including a function for recovering distorted data through the same clocking function as provided by the second ASIC; and
   a fiber optic transmitter mounted in the optical module, the transmitter including a laser positioned to convey optical signals to a remote optical receiver, a laser driver electrically coupled to the laser and to the second ASIC, the first ASIC including a clocking function and equalization function for data transmission, and the second ASIC including a function for recovering distorted data through the same clocking function as provided by the first ASIC.

8. A method of electrically communicating information at rates at least equal to 10-gigabits per second on a circuit board comprising the steps of:
   providing a system circuit board including an optical transmitter module with a laser diode and a laser driver;
   receiving electrical signals from an external source at a first position on the system circuit board;

clocking and equalizing/retiming the electrical signals on the system circuit board for data transmission;

conveying the equalized signals to a second position on the system circuit board through electrical traces;

receiving the signals at the second position and recovering distorted signals using a clock recovery and equalization/retiming step; and conveying the recovered equalized signals to the laser driver.

9. A method as claimed in claim 8 wherein the step of receiving electrical signals from the external source includes providing at least one board level IC chip electrically coupled to the first ASIC for supplying the electrical signals.

10. A method as claimed in claim 8 including in addition a step of providing an optical fiber optically coupled to the laser for receiving optical signals therefrom.

* * * * *